(12) United States Patent
Pettersson et al.

(10) Patent No.: US 9,594,156 B2
(45) Date of Patent: Mar. 14, 2017

(54) LASER SCANNER HAVING MEANS FOR CAPTURING A SPATIAL DIRECTION TO THE POINT ON A SURFACE

(75) Inventors: Bo Pettersson, London (GB);
Bernhard Sprenger, Widnau (CH);
Knut Siercks, Mörschwil (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 351 days.

(21) Appl. No.: 14/235,012

(22) PCT Filed: Jul. 25, 2012

(86) PCT No.: PCT/EP2012/064605
§ 371 (c)(1),
(2), (4) Date: May 5, 2015

(87) PCT Pub. No.: WO2013/014189
PCT Pub. Date: Jan. 31, 2013

(65) Prior Publication Data
US 2015/0301160 A1    Oct. 22, 2015

(30) Foreign Application Priority Data
Jul. 26, 2011   (EP) ..................................... 11175391

(51) Int. Cl.
*G01S 7/481*   (2006.01)
*G01S 17/93*   (2006.01)

(52) U.S. Cl.
CPC .............. *G01S 7/481* (2013.01); *G01S 17/93* (2013.01)

(58) Field of Classification Search
CPC ..... G02B 26/10; G02B 19/0085; G01S 17/88; G01S 7/4817; G01S 17/42; G01S 7/4811
(Continued)

(56) References Cited

U.S. PATENT DOCUMENTS 5,973,788 A * 10/1999 Pettersen ................ G01S 5/163
356/614
7,631,839 B1   12/2009 Duncan et al.
(Continued)

FOREIGN PATENT DOCUMENTS

CN   101072661 A   11/2007
CN   101506684 A   8/2009
(Continued)

OTHER PUBLICATIONS

European Search Report dated Dec. 20, 2011 as received in Application No. EP 11 17 5391.
(Continued)

*Primary Examiner* — Que T Le
(74) *Attorney, Agent, or Firm* — Maschoff Brennan

(57) ABSTRACT

A laser scanner measures a surface of spaces and/or objects and produces a point cloud representing the surface. The laser scanner includes a laser source for producing laser light, a detector for receiving the laser light, and a platform that pivots relative to a stationary base of the laser scanner. The laser light is directed to a particular point on the surface through an outlet point. Laser light scattered at the particular point is received through an inlet point on the platform. A distance to the particular point is determined using laser light scattered and received by the detector. A direction to the particular point is detected using, for example, one or more sensors for determining a pivot position of the platform relative to the base. A parallel kinematic drive pivots the platform relative to the base to scan the laser beam over points of the surface.

20 Claims, 4 Drawing Sheets

(58) Field of Classification Search
USPC ......... 250/234–236, 221, 239; 356/375, 376,
356/139.03, 141.1, 141.5, 141.2
See application file for complete search history.

(56) References Cited

U.S. PATENT DOCUMENTS

| | | |
|---|---|---|
| 7,933,055 B2 | 4/2011 | Jensen et al. |
| 2008/0093322 A1 | 4/2008 | Ehrenleitner |
| 2010/0201964 A1 | 8/2010 | Kugler et al. |
| 2011/0006943 A1 | 1/2011 | Shaffer |

FOREIGN PATENT DOCUMENTS

| | | |
|---|---|---|
| WO | 97/40342 A2 | 10/1997 |
| WO | 2008/019856 A1 | 2/2008 |

OTHER PUBLICATIONS

"Parallel Kinematics", Jul. 16, 2007, pp. 12-49.
Röse et al., "Parallelkinematische Mechanismen zum intrakorporalen Einsatz in der laparoskopischen Chirurgie" Jan. 19, 2011.

\* cited by examiner

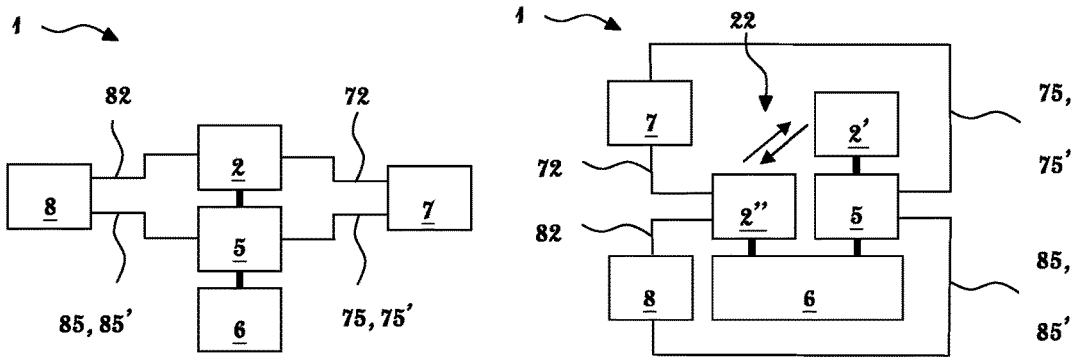
Fig. 6
Fig. 7
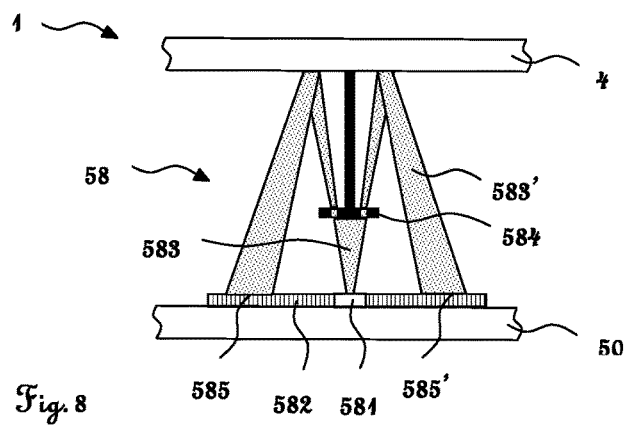
Fig. 8
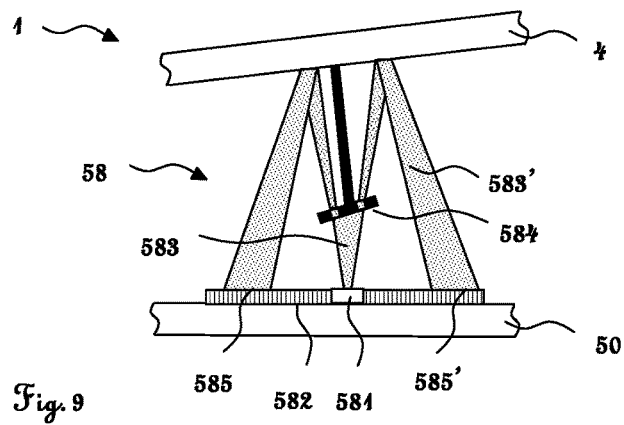
Fig. 9

LASER SCANNER HAVING MEANS FOR CAPTURING A SPATIAL DIRECTION TO THE POINT ON A SURFACE

FIELD OF THE INVENTION

The invention relates to a laser scanner for measuring a surface and for generating a point cloud coordinately reproducing the surface.

BACKGROUND

WO1997/040342A2 describes a laser scanner for capturing an object at an arbitrary distance in three dimensions. The laser scanner has a laser source for generating laser light and a laser detector for receiving laser light from the laser source. Generated laser light emerges from the laser scanner at an exit point and is scattered by the object and reenters the laser scanner at an entry point. The laser scanner has rotational drives for rotating mirrors with two degrees of freedom about two mutually orthogonal axes and pickups for establishing this rotation. By rotating the mirrors, laser light scans over a multiplicity of scattering points of the object. The laser source, the laser detector and the pickups emit state signals. The laser scanner has an evaluation unit for evaluating the state signals. Evaluating the pulse runtime of the scattered laser light provides distance values between the laser scanner and the scattering points of the object. The laser scanner can be positioned on a stand at the object and is fed electric current by an electrical power supply unit. The field of view of the laser scanner is 40°×40°. For individual measurements over a distance of from 1 to 50 m, the positional accuracy is +/−6 mm and the path accuracy is +/−4 mm. The scanning speed of the rotational drives is 1000 to 5000 points/second.

Such a laser scanner was distributed by the applicant under the name HDS2500; its currently distributed successor is denoted by HDS3000. In the HDS3000, the field of view, being 360°×270°, is significantly larger; the positional accuracy and the path accuracy of the distance values stayed the same. The scanning speed of the rotational drives is 5000 points/second in the vertical direction and 20 000 points/second in the horizontal direction. The HDS3000 has a mass of 16 kg; its spatial dimensions are 27×37×51 cm$^3$ (both specifications relate to the HDS3000 without evaluation unit, without electrical power supply unit and without stand).

Further details in respect of the design of a laser scanner are disclosed in WO2008/019856A1. This laser scanner has a rotational body, which is rotatably mounted about a rotor by means of a first rotational shaft; the rotor in turn is rotatably mounted on a stator by means of a second rotational shaft. A first rotational drive drives the rotational body and a second rotational drive drives the rotor. Arranged in the rotor are the first rotational drive, the laser source and the laser detector. Arranged on the rotational body are the exit point, the entry point and mirrors. Laser light originating from the laser source in the rotor is guided by means of an optical transmission connection to the rotational body and, from there, to the exit point via mirrors. Laser light scattered by the object enters the rotational body at the entry point and is guided to the laser detector in the rotor via mirrors and an optical reception connection. The optical transmission connection and the optical reception connection are optical transmission elements which are assigned to the rotor and the rotational body and which are decoupled from the rotation.

SUMMARY

A first object of the invention consists of providing an improved laser scanner. Further objects of the invention consist of the provision of a laser scanner with high positional accuracy and path accuracy, with high scanning speed with a simple design, with small spatial dimensions, with a low weight, with low electric power consumption, with high suitability for use in the field and with low production and maintenance costs.

According to the invention, the laser scanner for measuring a surface of spaces and/or objects and for generating a point cloud coordinately reproducing the surface has a laser source for generating laser light and a laser detector for receiving laser light from the laser source; an exit point for the exit of generated laser light in the form of a focused laser beam, directed on the respective point on the surface, and an entry point for the entry of laser light scattered at the respective point on the surface are arranged on a platform of the laser scanner which can be pivoted in relation to a stationary base of the laser scanner in a scanning manner. The laser scanner moreover has a distance measurement functionality for determining a respective distance to the respective point on the surface on the basis of laser light scattered at the respective point on the surface and received by the laser detector and means for capturing a respective spatial direction to the respective point on the surface, in particular wherein the means have one or more pickups for establishing a respective pivot position of the platform in relation to the base. According to the invention, a parallel kinematic drive pivots the platform in relation to the base for scanning the laser beam over a multiplicity of points on the surface.

The laser scanner with parallel kinematic drive pivots a platform in direct engagement. Compared to a serial kinematic arrangement from the prior art with two rotational drives, of which a first rotational drive drives a rotor, on which rotor the second rotational drive is attached, this has a number of surprising technical effects:

Firstly, the positional accuracy and the path accuracy of the laser scanner are increased. Actuation errors and rotational inaccuracies can no longer propagate from a first rotational drive to the second rotational drive.

Secondly, the laser scanner no longer has an axis-specific scanning speed. The two rotational drives have the same design in terms of torque but must drive differently large masses. The result of this is that the scanning speed about the vertical axis of the first rotational drive is several orders smaller than that about the horizontal axis of the second rotational drive.

Thirdly, the scanning speed of the laser scanner is increased. For a grid-shaped or spiral-shaped two-dimensional scan over n scattering points of the object, each one of the two rotational drives must carry out n rotations; overall, 2n rotations are carried out. In contrast thereto, the parallel kinematic drive pivots the platform in a helical movement about a fixed point. For a comparable two-dimensional scan over n scattering points of the object, the parallel kinematic drive merely needs to carry out n pivot movements which, ceteris paribus, doubles the scanning speed.

Advantageous developments of the invention emerge from the features of the dependent claims.

The parallel kinematic drive advantageously pivots the platform with largely the same scanning speed in the horizontal direction and in the vertical direction.

During pivoting in the horizontal direction and in the vertical direction, the laser scanner has largely the same inertia and largely the same scanning speed, increasing the positional accuracy and the path accuracy thereof.

The parallel kinematic drive advantageously has a plurality of actuators, which are arranged in a drive plane on the platform, and of which each acts directly on the platform; preferably, the parallel kinematic drive emits a first state signal for each setting of an actuator.

The actuators are active control members and move the platform. The actuators of the parallel kinematic drive are now arranged in a drive plane on the platform, grouped both functionally and in space; this simplifies the design of the laser scanner and reduces the spatial dimensions of the laser scanner since, unlike in the prior art, rotational drives are no longer situated in several planes arranged one above the other. Moreover, such a drive plane can be encapsulated in a simple and effective manner both against the emergence of vibrations of the parallel kinematic drive and against the ingress of dust, vapor and water from the surroundings, increasing the suitability for use in the field of the laser scanner and keeping maintenance costs low.

The parallel kinematic drive advantageously has at least two actuators; each actuator is either a linear actuator or a rotational actuator.

Two or more actuators pivot the platform of the laser scanner in a helical movement. Thus, it is possible to arrange two actuators in one drive plane with two degrees of freedom; and six actuators can be arranged in a drive plane with six degrees of freedom. Successive adjusting of the actuators clockwise or counterclockwise pivots the platform in a helical movement for a two-dimensional scan.

A pickup advantageously establishes the pivoting of the platform in relation to the base; for each captured pivoting of the platform in relation to the base, the pickup outputs a second state signal. Advantageously, a pickup is assigned to an actuator, which pickup establishes the pivoting of the platform in relation to the base in the region of the actuator assigned thereto and/or a pickup is assigned to a stabilizer, which pickup establishes the pivoting of the platform in relation to the base in the region of the stabilizer assigned thereto.

Compared to a serial kinematic arrangement from the prior art with two rotational drives and one rotational pickup per rotational drive, where the rotational pickups capture rotations in respect of different references such as rotor and stator, this parallel kinematic arrangement of the pickups brings the surprising technical effect that the pivoting of the platform is captured a number of times in relation to the same reference, namely the base. Hence, firstly, there is no error propagation and, secondly, there is a reduction in the measurement error by forming a mean value in the case of two or more pickups for two or more actuators and/or stabilizers; this increases the positional accuracy and the path accuracy of the laser scanner.

The actuators are advantageously attached to a base; the actuators direct at least part of the load of the platform into the base. The parallel kinematic drive advantageously has a stabilizer; the stabilizer is attached directly to the platform by means of a first bearing; the stabilizer is attached directly to a base by means of a further bearing; these bearings are mechanically connected to one another by means of a hinged arm; the stabilizer directs at least part of the load of the platform into the base.

The stabilizer is a passive control member and stiffens the platform. The load of the platform can be directed into the base both by means of the actuators and by means of a stabilizer. The stabilizer can be used to set the stiffness of the parallel kinematic drive in a targeted manner by the stiffness characteristics of the stabilizer. If only part of the load of the platform is directed into the base by means of the actuators, the actuators are unloaded, which is why the actuators partly unloaded thus can, in terms of the spatial dimensions, have a smaller design compared to actuators which have not been partially unloaded, leading to savings in the production costs and in the electric power consumption during operation of the actuators. This moreover reduces the spatial dimensions of the laser scanner and reduces its weight.

The actuators and/or the stabilizer advantageously damp at least some of the vibrations of the parallel kinematic drive.

The actuators as active control members and the stabilizer as active control member can also damp vibrations on the platform which are created during the operation of the parallel kinematic drive. By setting damping characteristics of the actuator and/or by setting damping characteristics of the stabilizer, vibrations on the platform can be damped in a targeted manner, bringing about a high positional accuracy and path accuracy of the laser scanner.

Advantageously a rotational actuator has a rotational drive, a rotatable arm and a bearing; the rotational actuator is attached directly to the platform by the bearing. The bearing is advantageously a hinge bearing or a pivot bearing or a flexural element.

In this rotational actuator, the rotatable arm converts a torque of the rotational drive to an output moment of the rotational actuator, which output moment acts directly on the platform by the bearing. Compared to the linear drive of a linear actuator, which does not have such a mechanical transmission ratio, the rotational actuator therefore requires a rotational drive with a relatively small design in order to achieve the same output moment, leading to savings in the production costs and in the electric power consumption during the operation of the rotational actuator. Moreover, unlike in the case of the linear actuator, the platform load is not supported directly by the linear drive but rather by the bearing, reducing wear and tear and hence keeping the maintenance costs of the rotational actuator low.

Advantageously, the laser source, the laser detector, the exit point, the entry point and mirrors for beam guidance form a first optical unit on the platform.

Unlike in the prior art, there is no separate arrangement of laser source and laser detector on a rotor and exit point, the entry point and mirrors on a rotational body. As a result, the beam guidance is simplified since there is no need for optical transmission elements which are decoupled from the rotation. As a result, the design of the laser scanner is simplified and the production costs of the laser scanner are reduced. Also, such an optical unit can be easily and effectively encapsulated against the ingress of dust, vapor and water from the surroundings, increasing the suitability for use in the field of the laser scanner and keeping maintenance costs low.

Advantageously, the first optical unit emits further state signals via electrical or optical lines, preferably via optical waveguides, and/or the first optical unit emits second state signals and further state signals via electrical or optical lines, preferably via optical waveguides.

The first optical unit communicates state signals to an external evaluation unit by means of cost-effective electrical or optical lines. For reasons of resistance against interference, the state signals can be communicated resistant against interference by means of optical waveguides, which increases the suitability for use in the field.

Advantageously, the exit point, the entry point and mirrors for beam guidance form a second optical unit on the platform; and the laser source and the laser detector form a platform-distant optical unit on a further base.

Hence, only the exit point, the entry point and the mirrors are arranged on the platform, functionally and spatially grouped in a second optical unit, while the laser source and the laser detector form a platform-distant optical unit on a further base. Unlike the rotational body in the prior art, the platform therefore no longer needs to be designed, additionally, for receiving a second rotational drive together with a rotational bearing functionally connected to the second rotational drive. The platform can be built in a lightweight mode of construction and can have small spatial dimensions. As a result, not only is the design of the laser scanner simplified and are the spatial dimensions thereof reduced, but the weight of the laser scanner is also reduced.

BRIEF DESCRIPTION OF THE DRAWINGS

Further advantages and features of the invention can be seen in an exemplary manner from the following description of currently preferred embodiments in conjunction with the attached drawings. In the drawings:

FIG. 6 schematically shows part of the embodiment of a laser scanner according to FIGS. 1 to 4, with an evaluation unit, electrical power supply unit and stand;

FIG. 7 schematically shows part of the embodiment of a laser scanner according to FIGS. 1 to 3 and 5, with an evaluation unit, electrical power supply unit and stand;

FIG. 8 schematically shows part of the embodiment of a laser scanner according to FIGS. 1 to 3, with pickups for capturing the horizontally aligned platform;

FIG. 9 schematically shows part of the embodiment of a laser scanner according to FIG. 8, with pickups for capturing the upwardly pivoted platform;

DETAILED DESCRIPTION

Figure 1:
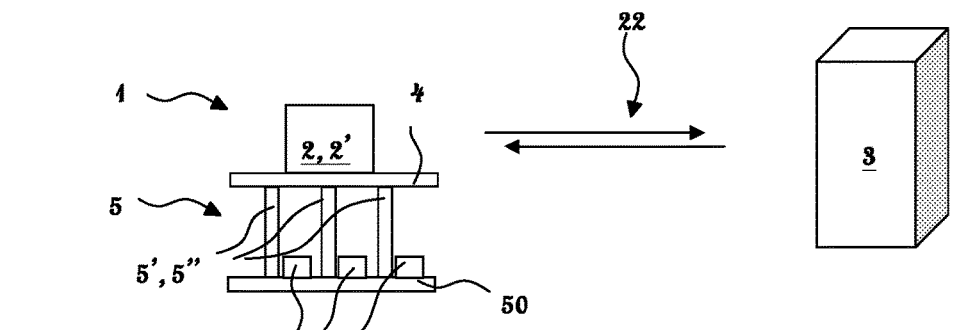
FIG. 1 schematically shows part of an embodiment of a laser scanner with parallel kinematic drive with a horizontally aligned platform.

The figures show several embodiments of a laser scanner 1 with a parallel kinematic drive 5. In accordance with FIGS. 1 to 3, the laser scanner 1 captures at least one surface of a distant object 3 in two dimensions (2D) or in three dimensions (3D) in spatial coordinates of the polar coordinates by scanning laser light 22 in the form of a focused laser beam. The object 3 can have any size, form or shape. The distance between the laser scanner 1 and the object 3 lies in the range from 0.1 to 100 m, preferably one to 1200 m. As shown in FIGS. 6 and 7, the laser scanner 1 can be placed onto a stand 6 at the object 3; the laser scanner 1 also has an evaluation unit 7 and an electrical power supply unit 8. However, the use of a stand is not mandatory for the operation of the laser scanner 1. The mass of the laser scanner 1 is less than 10 kg, preferably less than 3.0 kg, preferably less than 0.3 kg, preferably less than 0.1 kg; this being without evaluation unit 7, without electrical power supply unit 8 and without stand 6.

The laser scanner 1 has several embodiments of an optical unit 2, 2', 2", which are shown in FIGS. 1 to 7. A first optical unit 2 comprises a laser source 21 for generating laser light 22, a laser detector 23 for receiving laser light 22, an exit point 24 for the exit of laser light 22 from the laser scanner 1 directed to a respective point on the surface, an entry point 24' for the entry of laser light 22 scattered at the respective point on the surface into the laser scanner 1 and mirrors 25 for beam guidance of the laser light 22. A second optical unit 2' comprises the exit point 24, the entry point 24' and the mirrors 25. A platform-distant optical unit 2" comprises the laser source 21 and the laser detector 23. The first optical unit 2 and the second optical unit 2 are each arranged on a platform 4; the platform-distant optical unit 2" is arranged on a further base 50'. In accordance with FIGS. 1 to 4 and 6, the first optical unit 2 and the second optical unit 2' are arranged on the stand 6 by means of the platform 4 and the parallel kinematic drive 5. In accordance with FIGS. 5 and 7, the platform-distant optical unit 2" is arranged on the stand 6 by means of the further base 50'.

The laser source 21 is a laser with pulsed or continuous laser light 22. Thus, the laser source 21 is a pulsed laser with laser light 22 having a wavelength of 532 nm, 905 nm, etc. The laser source 21 can also be a continuous laser with laser light 22 having a wavelength of 635 nm, 650 nm, etc. If the present invention is known, a person skilled in the art can also use electromagnetic waves such as radio waves, microwaves, visible light, x-ray radiation, gamma radiation etc. instead of laser light. Laser light 22 generated by the laser source 21 is guided to the exit point 24 by means of mirrors 25. The mirrors 25 are plane mirrors; the mirrors 25 can be partly transmissive. The exit point 24 and the entry point 24' consist of one or more optical lenses with a focal length of 30 to 80 mm. Laser light 22 scattered by scattering points of the object 3 is guided to the laser detector 23 by means of mirrors 25. Here, the term "scattering" is understood to mean a deflection of laser light 22 by interaction with the object 3. Locally, this interaction occurs at a scattering point of the object 3. The scattering point can be a natural solid state component of the object 3 or else be a reflecting target marker temporarily attached to the object 3 for operating the method. The laser scanner 1 can measure a phase shift or a pulse run-time difference between the generated laser light 22 and the scattered laser light 22.

The laser scanner 1 has a distance measurement functionality for determining a respective distance to the respective point on the surface on the basis of laser light 22 scattered at the respective point on the surface and received by the laser detector 23 and means for capturing a respective spatial direction to the respective point on the surface, in particular wherein the means have one or more pickups 58 for establishing a respective pivot position of the platform 4 in relation to the base 50.

The laser detector 23 is a sensor with an index of photodiodes, such as a charge coupled device (CCD), a complementary metal oxide semiconductor (CMOS), etc. In addition to the sensor, the laser detector 23 can have a CCD camera with a resolution of 2 to 20 Mpx. The camera can image the object 3, it can zoom into the image of the object 3 and magnify sections of the object 3, onto which the laser scanner 1 can be aligned. The laser detector 23 captures the texture of the object 3 during an individual measurement over a distance of from 1 to 50 m with a positional accuracy of +/−6 mm and with a path accuracy of +/−4 mm. The laser source 21 and the laser detector 23 emit further state signals 72 for generated and received laser light 22 by means of electrical or optical lines such as optical waveguides. Laser source 21 and laser detector 23 are fed with more electric current 82 by the electrical power supply unit 8 by means of electrical or optical lines.

The laser scanner 1 can therefore be an electro-optical distance measuring instrument (EDM), as is installed as a module, inter alia, in the products distributed by the applicant which are denoted by Disto D2, Disto D5, Disto D8 or 3D Disto, Viva TS15, HDS 6200. These EDM modules can be currently conventional phase measuring instruments or distance measuring instruments with waveform digitizer (WFD) technology. The obtainable positional and path accuracies and measuring rates are also dependent on the employed transmission power and reception optical unit. Using current technology, such EDM modules obtain positional and path accuracies in the mm range and scanning speeds (measuring rates) in the 100 Hz and kHz range. The masses of such EDM modules are merely 30 g to 50 g; the spatial dimensions of these EDM modules are 2×3×4 cm$^3$ for the phase measuring instrument and 2×4×6 cm$^3$ for the WFD distance measuring instrument.

Figure 2:
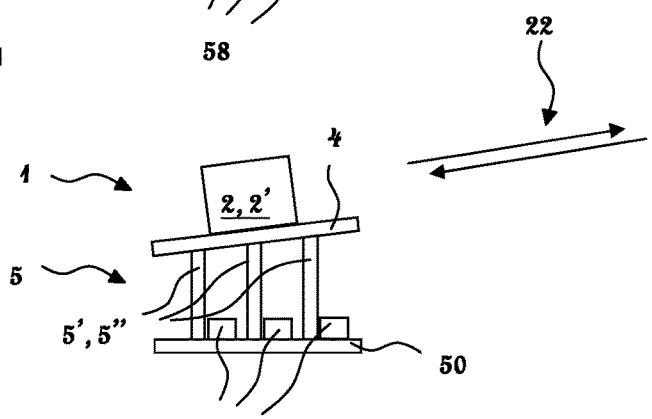
FIG. 2 schematically shows part of the embodiment of a laser scanner according to FIG. 1, with the platform pivoted upward.
Figure 3:
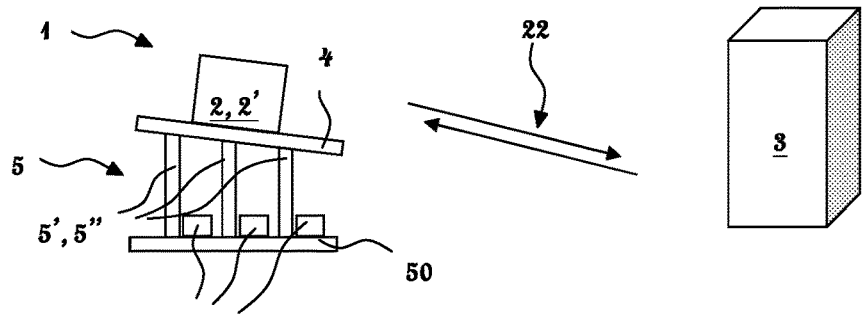
FIG. 3 schematically shows part of the embodiment of a laser scanner according to FIG. 1, with the platform pivoted downward.
Figures 4, 5:
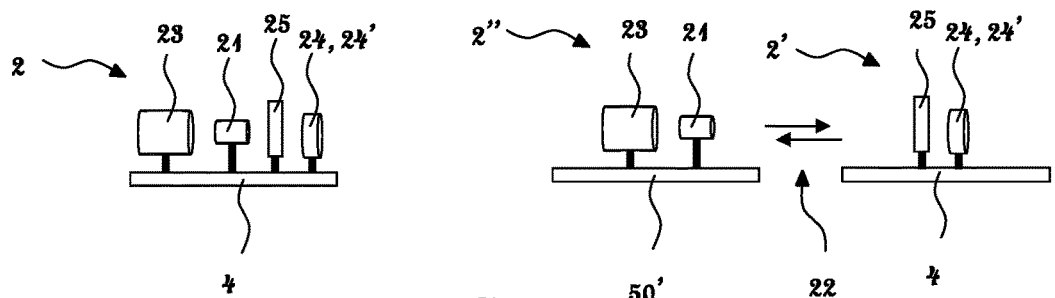
FIG. 4 schematically shows part of a first embodiment of a laser scanner according to FIGS. 1 to 3, with entry point, exit point and mirror on the platform.
FIG. 5 schematically shows part of a second embodiment of a laser scanner according to FIGS. 1 to 3, with entry point, exit point, mirror, laser source and laser detector on the platform.

In accordance with FIGS. 1 to 3, actuators 5' and stabilizers 5" of the parallel kinematic drive 5 are arranged on the platform 4 of the laser scanner 1 and act directly on the platform 4. The platform 4 is pivoted in relation to a base 50 by the parallel kinematic drive 5. The platform 4 is pivoted with largely the same scanning speed in the horizontal direction and in the vertical direction. The term "largely" is used within the meaning of >=90%, i.e. deviations of 10% in the scanning speeds are possible. The parallel kinematic drive 5 has a control unit for setting the actuators 5', which control unit emits a first state signal 75 by electrical or optical lines for each setting of the actuators 5'. The pivoting of the platform 4 in relation to the base 50 can be established by a pickup 58 with pickup signals 59. The pickup 58 also has a control unit, which emits a second state signal 75' by electrical or optical lines for each captured pivoting of the platform 4. A pickup 58 is advantageously assigned to an actuator 5' or stabilizer 5", which pickup 58 establishes the pivoting of the platform 4 in relation to the base 50 in the region of the actuator 5' or stabilizer 5" assigned thereto. The actuators 5' and the pickup 58 are fed with electric current 85, 85' by means of electrical or optical lines from the electrical power supply unit 8.

The pickup 58 operates on contactless principles and is arranged on the base 50. A multiplicity of embodiments of pickups 58 can be implemented; in this respect, FIGS. 8 and 9 show an exemplary embodiment. The pickup 58 has an optical transmitter 581, such as a light-emitting diode (LED), a laser diode, etc., and an optical sensor 582, such as a one-dimensional or two-dimensional photocell arrangement. A light point 583 emitted by the optical transmitter 581 is reflected by the platform 4 and captured by the optical sensor 582. In the case of an unpivoted platform 4 according to FIG. 8, the optical sensor 582 captures the scattered light point in a reference point of the photocell arrangement. In the case of a pivoted platform 4 according to FIG. 9, the optical sensor 582 captures the scattered light point in a signal point which, depending on size and direction of the pivoting, is at a distance from the reference point. The light point 583 emitted by the optical sensor 581 can illuminate an optical mask 584 and generate a mask pattern 583' with several points or lines, which mask pattern 583' is reflected by the platform 4 and captured by the optical sensor 582. The optical mask 584 is arranged on the platform 4 and is pivoted together with the platform 4. In the case of an unpivoted platform 4 according to FIG. 8, the optical sensor 582 captures the mask pattern 583' in a reference pattern 585, 585' of the photocell arrangement. In the case of a pivoted platform 4 according to FIG. 9, the optical sensor 582 captures the mask pattern 583' in a signal pattern 585,

585', which differs from the reference pattern 585, 585' depending on the size and direction of the pivoting. Comparing FIGS. 8 and 9 shows that the left-hand branch of the reflected mask pattern 583' supplies a narrower signal pattern 585 by pivoting the platform 4 upward while the right-hand branch of the reflected mask pattern 583' supplies a broader signal pattern 585' by pivoting the platform 4 upward. The pivoting of the platform 4 can be uniquely associated with each reference point or reference pattern with an accuracy of +/−5 μm, preferably +/−1 μm. If the present invention is known, a person skilled in the art can also apply the photocell arrangement to the platform 4 and capture the non-reflected light point 583 or the non-reflected mask pattern 583' there.

Figure 10:
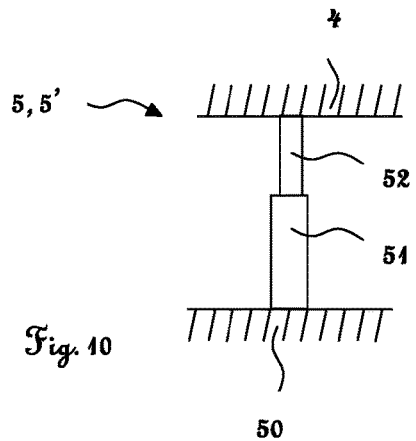
FIG. 10 schematically shows part of a first embodiment of a parallel kinematic drive according to FIGS. 1 to 7, with a linear actuator in an unpivoted position.
Figure 11:
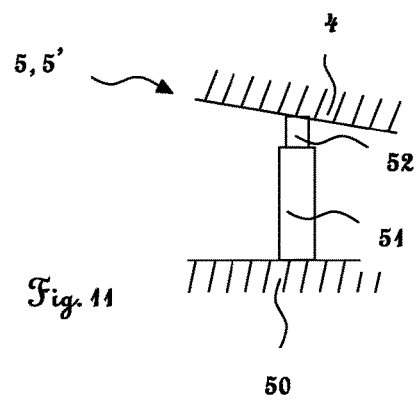
FIG. 11 schematically shows part of the embodiment of a parallel kinematic drive according to FIG. 10, with a linear actuator in a pivoted position.
Figure 12:
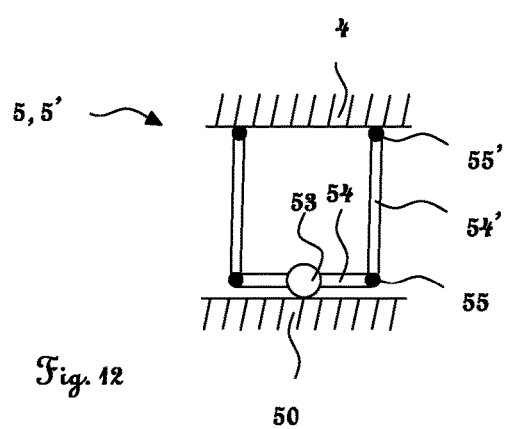
FIG. 12 schematically shows part of a second embodiment of a parallel kinematic drive according to FIGS. 1 to 7, with a rotational actuator with a hinge bearing double arm in an unpivoted position.
Figure 13:
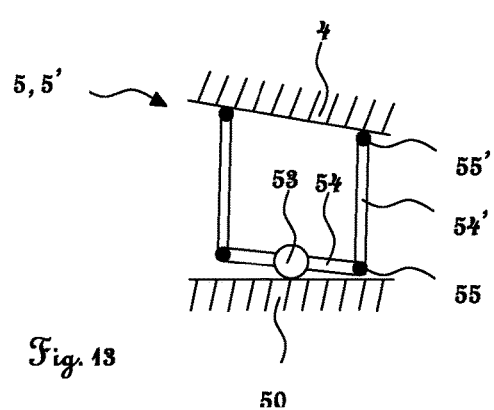
FIG. 13 schematically shows part of the embodiment of a parallel kinematic drive according to FIG. 12, with a rotational actuator with a hinge bearing double arm in a pivoted position.
Figure 14:
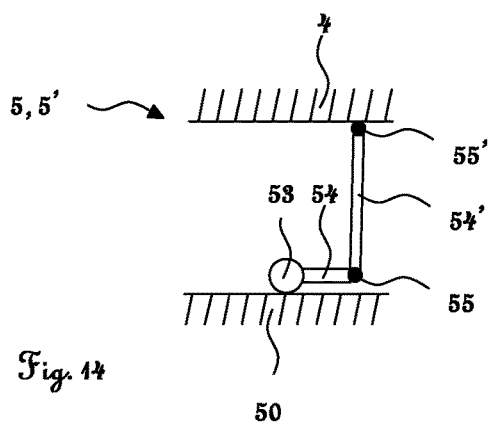
FIG. 14 schematically shows part of a third embodiment of a parallel kinematic drive according to FIGS. 1 to 7, with a rotational actuator with a hinge bearing single arm in an unpivoted position.
Figure 15:
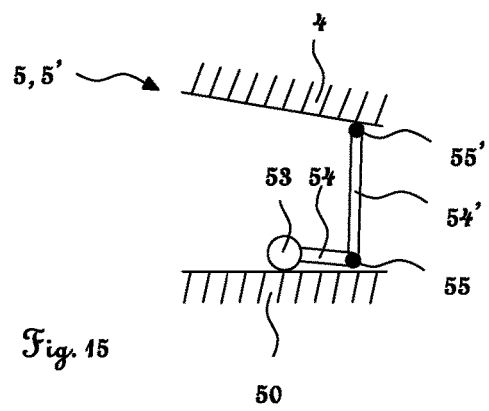
FIG. 15 schematically shows part of the embodiment of a parallel kinematic drive according to FIG. 14, with a rotational actuator with a hinge bearing single arm in a pivoted position.
Figure 16:
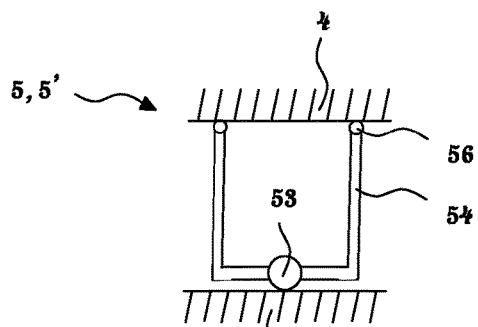
FIG. 16 schematically shows part of a fourth embodiment of a parallel kinematic drive according to FIGS. 1 to 7, with a rotational actuator with a rotational bearing double arm in an unpivoted position.
Figure 17:
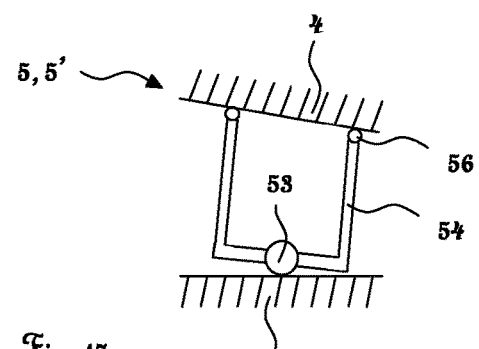
FIG. 17 schematically shows part of the embodiment of a parallel kinematic drive according to FIG. 16, with a rotational actuator with a rotational bearing double arm in a pivoted position.
Figure 18:
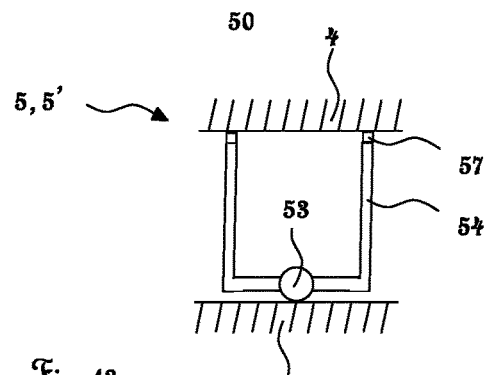
FIG. 18 schematically shows part of a fifth embodiment of a parallel kinematic drive according to FIGS. 1 to 7, with a rotational actuator with a flexural element double arm in an unpivoted position.
Figure 19:
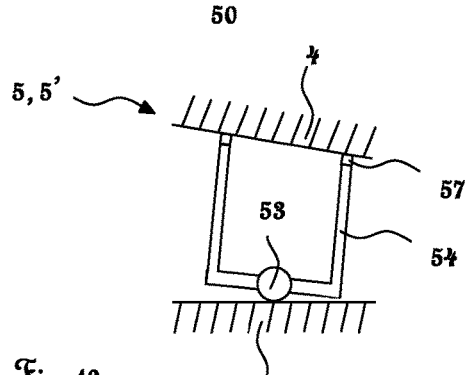
FIG. 19 schematically shows part of the embodiment of a parallel kinematic drive according to FIG. 18, with a rotational actuator with a flexural element double arm in a pivoted position.
Figure 20:
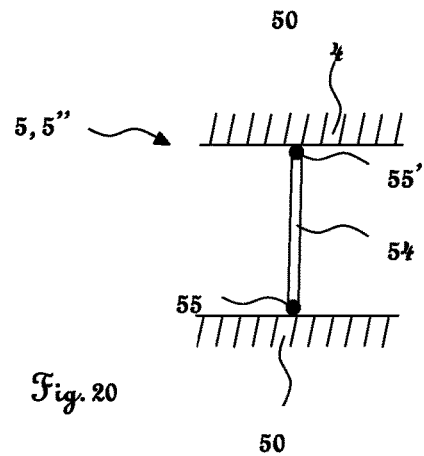
FIG. 20 schematically shows part of a fifth embodiment of a parallel kinematic drive according to FIGS. 1 to 7, with a stabilizer with hinge bearing single arm in an unpivoted position.
Figure 21:
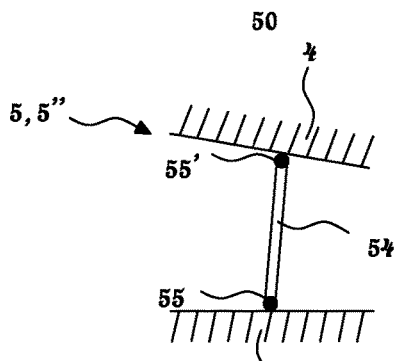
FIG. 21 schematically shows part of the embodiment of a parallel kinematic drive according to FIG. 20, with a stabilizer with hinge bearing single arm in a pivoted position.
Figure 22:
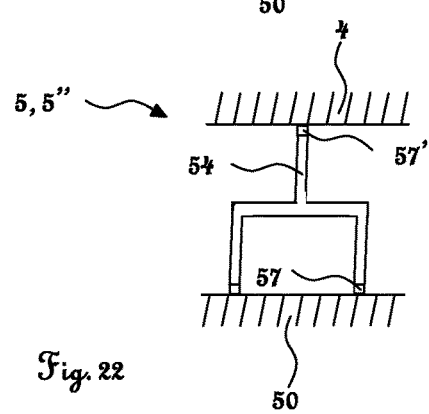
FIG. 22 schematically shows part of a sixth embodiment of a parallel kinematic drive according to FIGS. 1 to 7, with a stabilizer with flexural element double arm in an unpivoted position.
Figure 23:
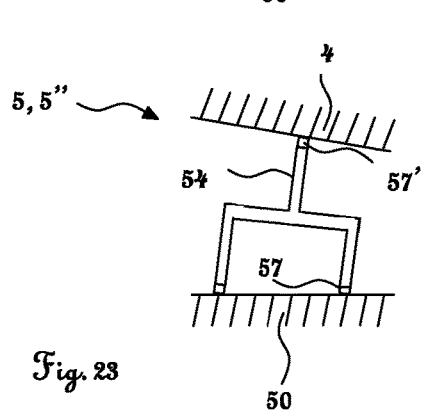
FIG. 23 schematically shows part of the embodiment of a parallel kinematic drive according to FIG. 22, with a stabilizer with flexural element double arm in a pivoted position.

Several embodiments of actuators 5' and stabilizers 5" are shown in FIGS. 10 to 23. The actuators 5' and stabilizers 5" are arranged in a drive plane between platform 4 and base 50. Actuators 5' are active control members; stabilizers 5" are passive control members. Each actuator 5' is either a linear actuator or a rotational actuator. FIGS. 10 and 11 show a linear actuator with a linear drive 51 and a stamp 52 which can be extended and retracted, moved by the linear drive. FIGS. 12 to 19 show different embodiments of a rotational actuator with a rotational drive 53, a rotatable arm 54, 54' and a bearing 55 to 57'. In accordance with FIGS. 12 and 13, the rotational actuator has a rotational drive 53 with a hinge bearing double arm 54, 54', 55, 55'; in accordance with FIGS. 14 and 15, the rotational actuator has a rotational drive 53 with a hinge bearing single arm 54, 54', 55, 55'; in accordance with FIGS. 16 and 17, the rotational actuator has a rotational drive 53 with a rotational bearing double arm 54, 56; in accordance with FIGS. 18 and 19, the rotational actuator has a rotational drive 53 with a flexural element double arm 54, 57; in accordance with FIGS. 20 and 21, the stabilizer 5" has a hinge bearing single arm 54, 55, 55'; in accordance with FIGS. 22 and 23, the stabilizer 5" has a flexural element double arm 54, 57, 57'. The various embodiments of actuators 5' and stabilizers 5" have different stiffness characteristics and damping characteristics, which can be set in a targeted manner.

The bearing 55 to 57' is either a hinge bearing 55, 55' or a rotational bearing 56 or a flexural element 57, 57'. Here, this is a commercially available bearing 55 to 57' known to a person skilled in the art. The hinge bearing 55, 55' is a bearing for three-dimensional adjustment movements with two degrees of freedom, such as a radial, oblique or axial bearing. The rotational bearing 56 is a bearing for two-dimensional adjustment movements with one degree of freedom, such as a radial or oblique bearing. The hinge bearing 55, 55' and the rotational bearing 56 can be both a friction bearing and an antifriction bearing. The hinge bearing 55, 55' and the rotational bearing 56 can consist of metallic inner and outer rings with maintenance-free sliding layers made of polytetrafluoroethylene (PTFE) or of shaft and housing disks with PTFE sliding layers. The flexural element 57, 57' can be a bearing for two-dimensional adjustment movements with one degree of freedom, such as a film hinge, band hinge, foil hinge, etc. made of polypropylene (PP), glass reinforced PP, etc. Such a flexural element 57, 57' has a thin walled, fold-like connection which, as a result of its flexibility, enables a restricted adjustment movement over an angle of +/−10°, preferably +/−15°. The flexural element 57, 57' can also be a helical spring, rod spring, etc. made of metal, an elastomer, rubber etc. With knowledge of the present invention, a person skilled in the art can also use different bearings such as magnetic bearings, immersion coils, friction bearings, etc.

In a drive plane, the parallel kinematic drive 5 has at least two actuators 5' and can have at least one stabilizer 5". Thus, two actuators 5' and one stabilizer 5" can be arranged to form a three-legged structure or three actuators 5' and two stabilizers 5" can be arranged to form a five-legged structure or six actuators 5' can be arranged to form a six-legged structure or five actuators 5' and three stabilizers 5" can be arranged to form an eight-legged structure. These arrangements of actuators 5' and stabilizers 5" can be symmetrical or else asymmetrical. Symmetrical means that each of the actuators 5' and stabilizers 5" are arranged at the same distance from one another and from a fixed point of the platform 4, which fixed point can be the center point of a polygonal or circularly symmetric platform 4; asymmetrical means that no such symmetric arrangement is present.

The parallel kinematic drive 5 can have an accelerometer or speed sensor for capturing vibrations on the platform 4. The accelerometer or speed sensor can be arranged temporarily or permanently on the parallel kinematic drive 5. In the case of a temporary arrangement of the accelerometer or the speed sensor on the parallel kinematic drive 5, the damping characteristics and stiffness characteristics of a stabilizer 5" are set in a calibration process in order to damp vibrations on the platform 4. In the case of a permanent arrangement of the accelerometer or the speed sensor on the parallel kinematic drive 5, the damping characteristics and stiffness characteristics of an actuator 5' are set in a control process in order to damp vibrations on the platform 4. Measurement signals from the accelerometer or the speed sensor are transmitted to the control unit of the actuator 5', which control unit sets damping characteristics and stiffness characteristics of the actuator 5' in a targeted manner in order to damp vibrations on the platform 4.

The evaluation unit 7 receives first state signals 75 from the parallel kinematic drive 5; it receives second state signals 75' from the pickup 58; and it receives further state signals 72 from the laser source 21 and from the laser detector 23. The state signals 75, 75', 75" can be communicated in a wired or wireless manner or by physical data transport. In the case of wired or wireless data communication, use is made of a protocol such as the transmission control protocol/Internet protocol (TCP/IP). In the case of a physical data transport, a mobile computer readable data storage medium such as a universal serial bus (USB) data storage medium is transported. Wired data communication takes place by means of a data bus such as Ethernet, USB, etc. Wireless data communication takes place via a radio network such as enhanced data rate for GSM evolution (EDGE), asymmetric digital subscriber line (ADSL), Institute of Electrical and Electronics Engineers (IEEE) 802.11, etc. Both the laser scanner 1 and the evaluation unit 7 have appropriate interfaces for the communication. If the present invention is known, a person skilled in the art can also embody the laser scanner with an evaluation unit integrated into the housing as a single unit.

These state signals 75, 75', 72 form tuples and specify a corresponding position of the actuators 5' and a correspondingly captured pivoting of the platform 4 for each generated and received laser pulse. From these state signals 75, 75', 72, the evaluation unit 7 establishes distance values between the laser scanner 1 and scattering points of the object 3. The distance values comprise a distance r and one or more angles θ, φ, such as an azimuth angle θ and a polar angle φ between the laser scanner 1 and the scanned scattering point of the object 3. The evaluation unit 7 preferably establishes a multiplicity of several thousand distance values from a multiplicity of several thousand state signals 75, 75', 72. The object 3 is captured two-dimensionally or three-dimensionally by means of these distance values. The distance values can be stored digitally in a data storage medium and can be depicted graphically on a screen.

It is understood that these depicted figures only schematically depict possible embodiments. The various approaches can likewise be combined both with one another and with methods and devices from the prior art. Kinematic reversals and rotations of the components are also possible. Thus, a person skilled in the art can reverse or rotate the relative position of platform 4 and base 50 in such a way that it is not the platform 5 that comes to rest above the base 50, as depicted in the figures, but that the base 50 comes to rest above the platform 4 or in the same horizontal plane. Similarly, a person skilled in the art can arrange the pickup 58 on the platform 4 instead of on the base 50, as depicted in the figures.

What is claimed is:

1. A laser scanner for measuring a surface of spaces and/or objects and for generating a point cloud coordinately reproducing the surface, comprising:
 a laser source for generating laser light and a laser detector for receiving laser light from the laser source;
 a platform which can be pivoted in relation to a stationary base of the laser scanner in a scanning manner, the platform having:
  an exit point for the exit of generated laser light in the form of a focused laser beam, directed on a point on the surface, and
  an entry point for the entry of laser light scattered at the point on the surface,
 distance measurement functionality for determining a distance to the respective point on the surface using laser light scattered at the point on the surface and received by the laser detector;
 means for capturing a spatial direction to the point on the surface; and
 a parallel kinematic drive configured to pivot the platform in relation to the base to scan the laser beam over a plurality of points on the surface.

2. The laser scanner as claimed in claim 1, wherein:
 the parallel kinematic drive pivots the platform with substantially the same scanning speed in the horizontal direction and in the vertical direction.

3. The laser scanner as claimed in claim 1, wherein the parallel kinematic drive has a plurality of actuators arranged in a drive plane on the platform, each acting directly on the platform.

4. The laser scanner as claims in claim 1, wherein:
 the parallel kinematic drive has at least two actuators; and
 each of the at least two actuators is either a linear actuator or a rotational actuator.

5. The laser scanner as claimed in claim 3, wherein:
 the actuators are attached to a base; and
 the actuators direct at least part of the load of the platform into the base.

6. The laser scanner as claimed in claim 4, wherein:
 at least one of the actuators is a rotational actuator having a rotational drive, a rotatable arm and a bearing.

7. The laser scanner as claimed in claim 1, wherein:
 the parallel kinematic drive has a stabilizer that:
  is attached directly to the platform by a first bearing; and
  is attached directly to a base by a second bearing, the first and second bearings being mechanically connected to one another by means of a hinged arm; and
  the stabilizer directs at least part of the load of the platform into the base.

8. The laser scanner as claimed in claim 5, wherein the actuators and/or the stabilizer damp at least some of the vibrations of the parallel kinematic drive.

9. The laser scanner as claimed in claim 6, wherein the bearing is a hinge bearing or a pivot bearing or a flexural element.

10. The laser scanner as claimed in claim 1, wherein:
 the means for capturing the spatial direction have a pickup for establishing the pivoting of the platform in relation to the base, wherein, for each captured pivoting of the platform in relation to the base, the pickup outputs a second state signal in respect of the respective pivot positions of the platform with respect to the base.

11. The laser scanner as claimed in claim 10, wherein:
 a pickup is assigned to an actuator, which pickup establishes the pivoting of the platform in relation to the base in the region of the actuator assigned thereto; and/or
 a pickup is assigned to a stabilizer, which pickup establishes the pivoting of the platform in relation to the base in the region of the stabilizer assigned thereto.

12. The laser scanner as claimed in claim 1, wherein the laser source, the laser detector, the exit point, the entry point and mirrors for beam guidance form a first optical unit on the platform.

13. The laser scanner as claimed in claim 12, wherein:
 the first optical unit emits further state signals via electrical or optical lines, preferably via optical waveguides; and/or
 the first optical unit emits second state signals and further state signals via electrical or optical lines.

14. The laser scanner as claimed in claim 13, wherein the second state signals and the further state signals are emitted via optical waveguides.

15. The laser scanner as claimed in claim 1, wherein:
 the exit point, the entry point and mirrors for beam guidance form a second optical unit on the platform; and
 the laser source and the laser detector form a platform-distant optical unit on a further base.

16. The laser scanner as claimed in claim 1, wherein:
 the means for capturing the spatial direction have one or more pickups for establishing a respective pivot position of the platform in relation to the base.

17. The laser scanner as claimed in claim 3, wherein:
 the parallel kinematic drive emits a first state signal for each setting of an actuator.

18. The laser scanner as claimed in claim 2, wherein:
 the parallel kinematic drive has a plurality of actuators arranged in a drive plane on the platform, each acting directly on the platform.

19. A method for operating a laser scanner as claimed in claim 16, comprising:
 transmitting first state signals to an evaluation unit from the parallel kinematic drive;
 transmitting second signals to the evaluation unit from the pickup;
 transmitting further state signals to the evaluation unit from the laser source and from the laser detector; and
 by the evaluation unit, establishing distance values between the laser scanner and the points on the surface from the first state signals, the second state signals and the further state signals.

20. The method as claimed in claim 19, wherein:
 the parallel kinematic drive is attached to the platform.

* * * * *